United States Patent
Stritzke

Patent Number: 5,601,294
Date of Patent: Feb. 11, 1997

[54] HEAD GASKET

[76] Inventor: Bernard G. Stritzke, 333 E. Turner Ave., Roselle, Ill. 60172

[21] Appl. No.: 603,914

[22] Filed: Feb. 22, 1996

Related U.S. Application Data

[63] Continuation-in-part of Ser. No. 431,554, May 1, 1995, abandoned.

[51] Int. Cl.$^6$ ........................................ F16J 15/32
[52] U.S. Cl. ...................... 277/235 B; 277/180; 277/226
[58] Field of Search ................................. 277/180, 226, 277/235 B, 226, 228, 235 R

[56] References Cited

U.S. PATENT DOCUMENTS

| | | | |
|---|---|---|---|
| 1,917,175 | 7/1933 | Wills et al. | 277/226 |
| 4,300,775 | 11/1981 | Ringel | 277/226 |
| 5,277,433 | 1/1994 | Ishikawa | 277/235 B |

FOREIGN PATENT DOCUMENTS 0241706  12/1962  Australia ............................... 277/226

Primary Examiner—Daniel G. DePumpo
Attorney, Agent, or Firm—Lyman R. Lyon, P.C.

[57] ABSTRACT

An engine head gasket comprises a relatively incompressible steel plate having compressible tubes with a thermally expandable non gaseous non compressible elastic media therein disposed within each combustion opening and elastomeric sealing beads molded about each coolant and oil flow aperture in the head gasket. Shim plates are utilized on each side of the steel plate as compression limiters for the sealing elements. The shim plates also function to retain the tubular combustion seals in place.

3 Claims, 2 Drawing Sheets

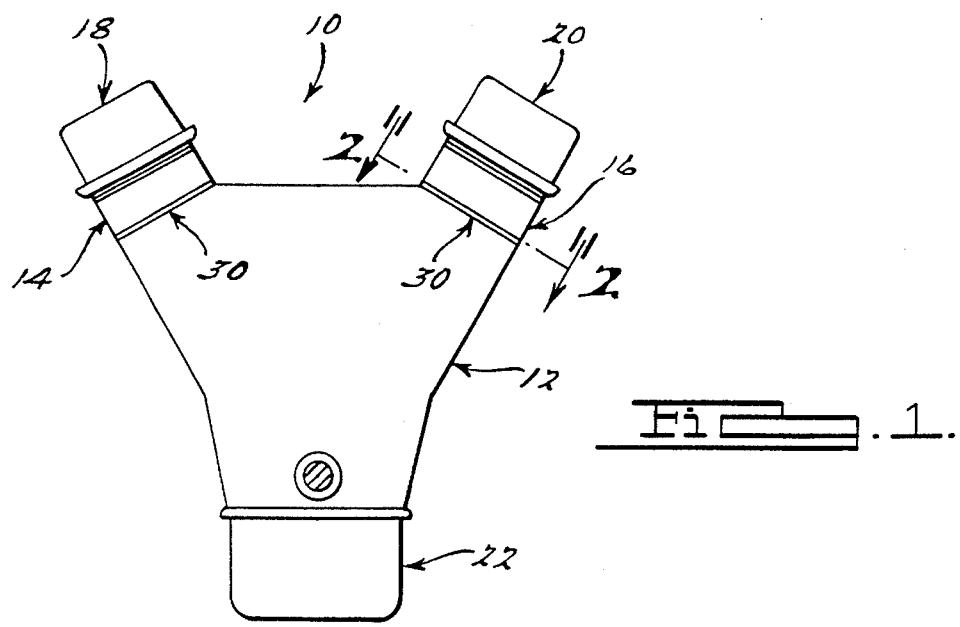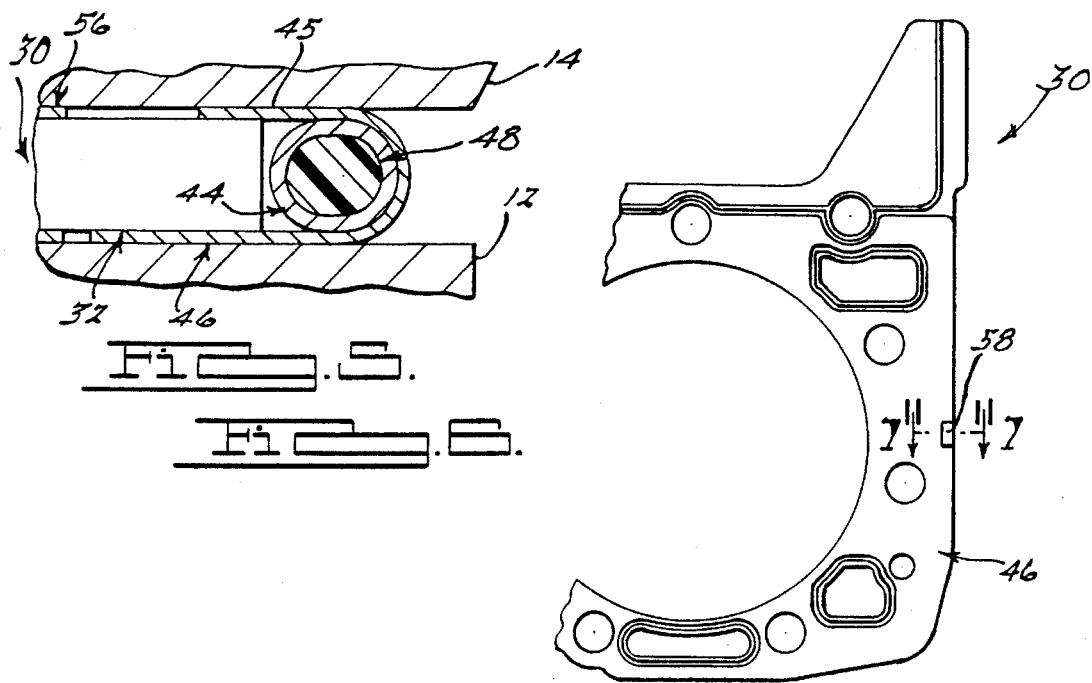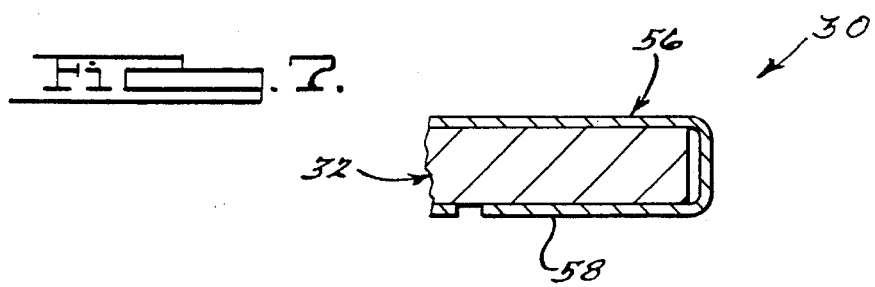

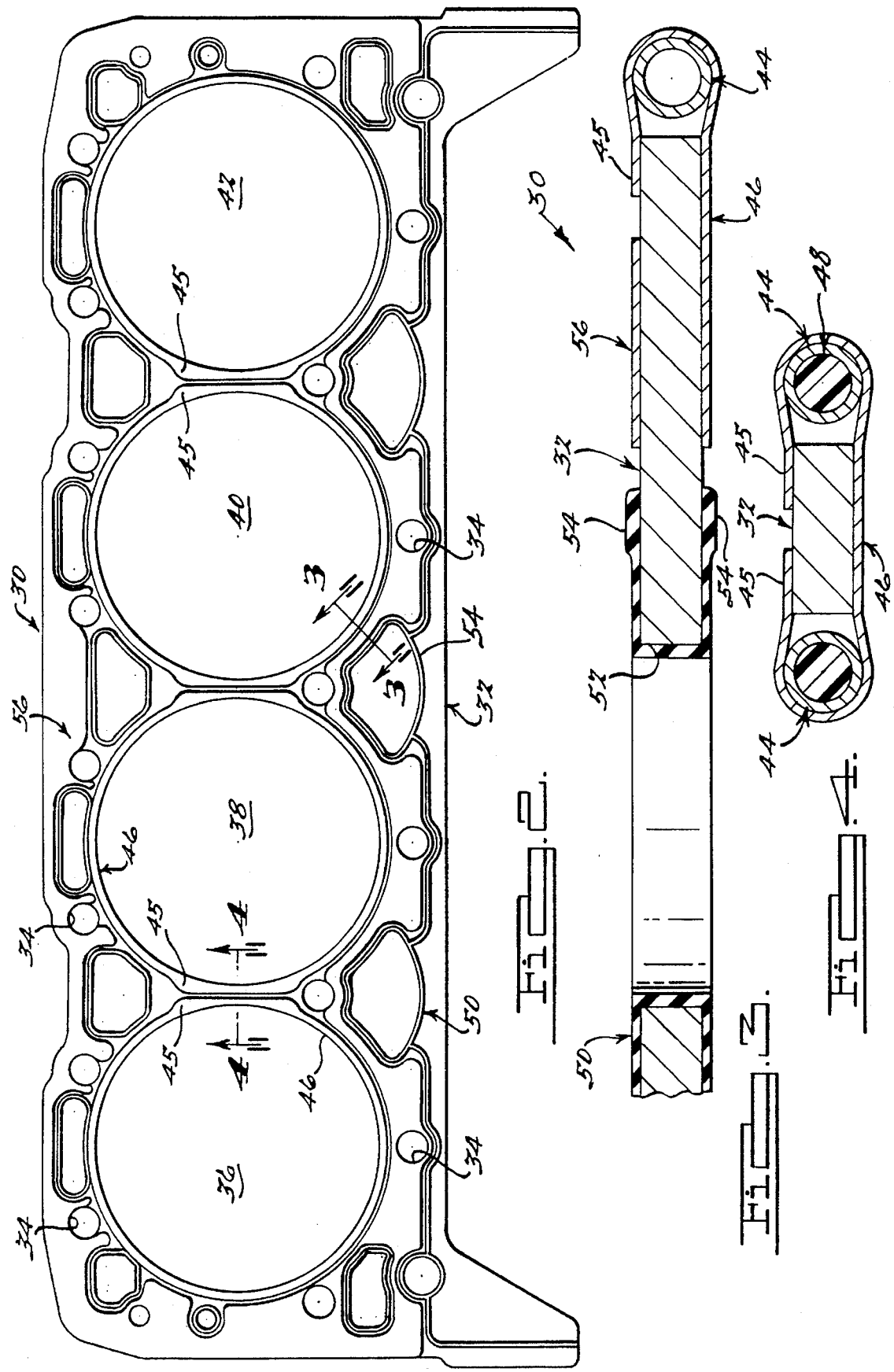

HEAD GASKET

This application is a continuation-in-part of my application Ser. No. 08/431,554 filed May 1, 1995 now abandoned.

BACKGROUND OF THE INVENTION

Automotive engines exhibit differential thermal expansion, variable combustion pressure, and vibration, all of which effect cyclical movement of the engine cylinder head relative to the engine block. Movement of the cylinder head relative to the engine block induces "creep" of the head gasket and eventual failure.

Known automobile engine head gaskets do not adequately respond to this problem since they usually comprise one or more sheets of compressible gasket material that are generally reinforced by relatively incompressible steel elements which surround each combustion chamber opening. Such conventional head gaskets require a relatively high installation force in that they rely on the stretch of the head bolts to act as springs to maintain a constant compression load on the gasket. However, as the compressible material of the head gasket exhibits deformation or "creep" with lapse of time, bolt stretch is relaxed and consequently the bias on the head gasket is relieved, setting the stage for a leak to occur. It is also to be noted that the metallic portions of known head gaskets are generally relatively thicker than the gasket body which promotes head bending and bore distortion upon assembly. Moreover, the metallic combustion seal about each combustion chamber absorbs a high percentage of the applied load in order to effect sealing, therefore precluding uniform load distribution.

Another problem that has not been fully addressed heretofore is that as temperature of the engine increases the head bolts elongate tending to reduce sealing of the combustion chamber. The optimum solution to this problem is a gasket that expands in direct relation to head bolt elongation.

SUMMARY OF THE INVENTION

The aforesaid problems are solved by a head gasket in accordance with the present invention, which comprises a steel gasket body which, in the environment of the typical internal combustion engine, is essentially incompressible. Two discrete sealing systems are employed for the steel gasket body, namely, a sealed thin wall compressible steel tube that is totally filled with a heat expandible media, and an elastomeric bead for sealing the coolant and oil flow openings. The seals offer positive sealing combined with superior memory after initial compression. Furthermore, the sealing systems require minimal load to effect initial compression thereby obviating head bending or bore distortion. Unlike traditional composite gaskets, the proposed steel gasket relies on a unique set of physical properties to effect sealing. The predetermined deflection of the sealing elements relative to the essentially incompressible steel gasket body translates to a specific sealing stress exhibited by the sealing system components. Stress relaxation or "creep" is minimized since the steel plates insure a relatively constant deflection of the combustion and coolant and oil seals throughout the entire life of the steel gasket and consequently obviate bolt load relaxation. Moreover, bolt torque is not critical since less than 10% of the bolt load is utilized to effect compression of the combustion and coolant and oil seals as opposed to 100% of the bolt load being utilized to compress and seal a composite gasket. Once 10% of the bolt load is achieved on the proposed gasket, the sealing system as a whole is compressed to the thickness of the steel plates plus shim material. Any additional bolt load is translated to bolt stretch and does not result in additional gasket deflection. The sealing phenomenon in the proposed gasket is dictated by the sealing system's ability to maintain a residual sealing stress on the cylinder head and block under a constant deflection. The tubular combustion seal is an almost perfect spring that does not exhibit loss of stress after repeated deflection within the design deflection range of the application. For example, given the thin wall shape factor, the tube can be deflected 10–15% of its original thickness without yielding.

The combustion sealing tube is welded to form a circle or particular shape of the cylinder head combustion opening. In accordance with a preferred embodiment, the combustion seal tube is totally filled with a material that expands at a predetermined engine operating temperature, for example, ethylene glycol, so that when the engine operating temperature increases, the internal pressure generated within the combustion seal tube may approach, for example, 1000 psi thereby increasing its sealing force.

The coolant fluid and oil sealing portions of the gasket comprise molded elastomeric beads on both sides of the steel gasket body that surround each coolant and oil flow opening in the head gasket. The elastomeric beads are capable of withstanding a high level of sealing stress over an extended period of time which translates to long term sealability.

Yet another feature of the invention is that the disclosed head gasket will not delaminate upon removal and the sealing systems will retain their integrity; resulting in a gasket that is reusable. This is in direct contradistinction to known head gaskets that delaminate upon removal incident to engine repair.

BRIEF DESCRIPTION OF THE DRAWINGS

FIG. 1 is a diagrammatic end view of a conventional V-8 internal combustion engine in which the head gasket of the invention has utility;

FIG. 2 is a view taken along the line 2—2 of FIG. 1;

FIG. 3 is a view taken along the line 3—3 of FIG. 2;

FIG. 4 is a view taken along the line 4—4 of FIG. 2;

FIG. 5 is a view similar to FIG. 4 with the gasket installed between the block and head of an engine;

FIG. 6 is a fragmentary bottom view of a portion of the gasket of FIG. 2; and

FIG. 7 is a view taken along the line 7—7 of FIG. 6.

DETAILED DESCRIPTION OF THE PREFERRED EMBODIMENT(S)

As seen in FIG. 1 of the drawings, a conventional V-8 engine 10 comprises a cylinder block 12 having cylinder heads 14 and 16, valve covers 18 and 20, and an oil pan 22 mounted thereon. A pair of similar head gaskets 30 are interposed between the engine block 12 and the cylinder heads 14 and 16, to preclude leakage of combustion gases, cooling fluids and oil from between the block 12 and cylinder heads 14 and 16.

As seen in FIG. 2 of the drawings, each head gasket 30, in accordance with a preferred constructed embodiment of the present invention, comprises a steel plate or body portion 32 having the external configuration of the cylinder heads 14 and 16 and their complementary seat on the engine block 12. The steel plate 32 is provided with a plurality of bolt holes 34 for the acceptance of bolts (not shown) that retain the heads 14 and 16 on the engine block 12.

In accordance with one feature of the present invention, sealing of combustion gases generated in, for example, four cylinders, identified in FIG. 2 by the numerals 36, 38, 40 and 42, is accomplished by a like plurality of similar circular metal combustion gas sealing tubes 44 that are positively retained on the plate 32 and disposed about the cylinders 36, 38, 40 and 42. The combustion seal tubes 44 are retained on the steel body portion 32 of the gasket 30 by upwardly and reentrantly folded circular lips 45 on a lower shim plate 46.

In accordance with one feature of the invention, the combustion seal tubes 44 are totally filled with a non-compressible but elastic media 48 having a high thermal coefficient of expansion, for example, liquid ethylene glycol. Therefore, expansion of the media is linearly transmitted to the tubes 44 which expand to augment sealing pressure on the heads 14 and 16 and block 12. It is important that all air or other gas be removed from the tubes 44.

As best seen in FIG. 5, when the head gasket 30 is installed, each steel tube 44 is compressed to an elliptical cross section between the block 12 and cylinder head 14 of the engine 10. The minor diameter of the elliptical cross section is determined by the additive dimension of the body portion 32 of the gasket 30 plus the thickness of the shim 46 underlying the plate 32 and an overlying shim 56. Stated in another manner, compression of the tube 44 is defined and limited by the shim plates 46 and 56 in combination with the thickness of the plate 32.

As best seen in FIG. 3 of the drawing, cooling fluids and oil which flow between the cylinder heads 14 and 16 and the block 12 are sealed by an elastomeric gasket 50 which is molded about a plurality of coolant and oil flow openings 52 in the steel body portion plate 32 of the gasket 30. The elastomeric gasket 50 may be provided with sealing ribs 54 on both sides thereof of predetermined thickness, compression of which is controlled by the lower shim plate 46 and an upper shim plate 56.

As best seen in FIG. 7 of the drawings, a tab 58 on the upper shim 56 is folded about the steel gasket body or plate 32 to effect retention of the shim 56 thereon. Accordingly, the head gasket 30 comprises a unitized assembly facilitates installation on the engine 10.

While the preferred embodiment of the invention has been disclosed, it should be appreciated that the invention is susceptible of modification without departing from the scope of the following claims.

I claim:

1. A gasket for disposition between the cylinder head and block of an internal combustion engine comprising;

a flat metal gasket body having discrete apertures for the flow of combustion gases, cooling fluid and oil therethrough;

a sealed metal combustion gas sealing tube disposed in each combustion gas aperture in said gasket body;

a non-compressible thermally expandable media totally filling each of said sealing tubes;

an elastomeric coolant seal molded about each coolant flow and oil aperture in said gasket body;

a first shim plate on one side of said gasket body, spaced from the elastomeric seals on said one side and having annular lips reentrantly folded about said metal combustion gas sealing tubes and over the opposite side of said gasket body, respectively; and a second shim plate on the opposite side of said gasket body spaced from the reentrantly folded lips of said first shim and from the elastomeric coolant seals on the opposite side of said gasket body whereby compression of said metal combustion gas sealing tubes and elastomeric coolant seals is limited by said gasket body and shim plates.

2. A gasket for disposition between the cylinder head and block of an internal combustion engine comprising;

a flat metal gasket body having discrete apertures for the flow of combustion gases, cooling fluid and oil therethrough;

a sealed metal combustion gas sealing tube disposed in each combustion gas aperture in said gasket body;

a non-gaseous thermally expandable media totally filling each of said tubes;

an elastomeric coolant and oil seal molded about each coolant and oil flow aperture in said gasket body and extending on opposite sides thereof, said coolant and oil seals having raised sealing portions on opposite sides thereof;

a first shim plate on one side of said gasket body, spaced from the elastomeric seals on said one side and having an annular lip reentrantly folded about said metal combustion gas sealing tube and over the opposite side of said gasket body; and a second shim plate on the opposite side of said gasket body spaced from the reentrantly folded lips of said first shim and from the elastomeric coolant and oil seals on the opposite side of said gasket body whereby compression of said metal combustion gas sealing tubes and the raised sealing portions of said elastomeric coolant seals is limited by said gasket body and shim plates.

3. A gasket for disposition between the cylinder head and block of an internal combustion engine comprising;

a flat metal gasket body having discrete apertures for the flow of combustion gases, cooling fluid and oil therethrough;

a metal combustion gas sealing tube disposed in each combustion gas apertures in said gasket body;

a thermally expandable fluid totally filling each of said tubes;

an elastomeric coolant seal and oil molded about each coolant and oil flow aperture in said gasket body;

a first shim plate on one side of said gasket body, spaced from the elastomeric seals on said one side and having a first plurality of annular lips reentrantly folded about said metal combustion gas sealing tubes and over the opposite side of said gasket body, respectively; and a second shim plate on the opposite side of said gasket body spaced from the reentrantly folded lips of said first shim and from the elastomeric coolant and oil seals on the opposite side of said gasket body, said second shim plate having a lip reentrantly folded over an edge portion of said gasket body to retain said second shim plate thereon, compression of said metal combustion gas sealing tubes and said elastomeric coolant and oil seals being limited by the additive thickness of said gasket body and shim plates.

* * * * *